United States Patent
Kasada

(10) Patent No.: US 10,878,845 B2
(45) Date of Patent: *Dec. 29, 2020

(54) MAGNETIC TAPE

(71) Applicant: FUJIFILM Corporation, Tokyo (JP)

(72) Inventor: Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 224 days.

This patent is subject to a terminal disclaimer.

(21) Appl. No.: 16/009,825

(22) Filed: Jun. 15, 2018

(65) Prior Publication Data

US 2018/0374506 A1 Dec. 27, 2018

(30) Foreign Application Priority Data

Jun. 23, 2017 (JP) .................. 2017-123080

(51) Int. Cl.
*G11B 5/702* (2006.01)
*G11B 5/008* (2006.01)
*G11B 5/706* (2006.01)
*G11B 5/735* (2006.01)
*G11B 5/78* (2006.01)

(52) U.S. Cl.
CPC .......... *G11B 5/702* (2013.01); *G11B 5/00813* (2013.01); *G11B 5/70615* (2013.01); *G11B 5/735* (2013.01); *G11B 5/78* (2013.01)

(58) Field of Classification Search
CPC . G11B 5/00813; G11B 5/702; G11B 5/70615; G11B 5/735; G11B 5/78
See application file for complete search history.

(56) References Cited

U.S. PATENT DOCUMENTS

2003/0228493 A1* 12/2003 Doushita .................. G11B 5/70
428/843.3
2012/0244387 A1 9/2012 Mori et al.

FOREIGN PATENT DOCUMENTS

| JP | H 02-168415 A | 6/1990 |
| JP | 09-190623 A | 7/1997 |
| JP | 2002-008910 A | 1/2002 |
| JP | 2006-054018 A | 2/2006 |
| JP | 2012-203956 A | 10/2012 |

OTHER PUBLICATIONS

Hanaor, Dorian, et al. "Anodic aqueous electrophoretic deposition of titanium dioxide using carboxylic acids as dispersing agents." Journal of the European Ceramic Society, vol. 31, No. 6, 2011, pp. 1041-1047.*
Wikipedia article on "Isoelectric Point", obtained on Mar. 2020.*
Office Action dated Mar. 3, 2020 by the Japanese Patent Office in Japanese Patent Application No. 2017-123080.

* cited by examiner

*Primary Examiner* — Holly C Rickman
*Assistant Examiner* — Lisa Chau
(74) *Attorney, Agent, or Firm* — Sughrue Mion, PLLC

(57) ABSTRACT

The magnetic tape includes a non-magnetic support; a magnetic layer including ferromagnetic powder and a binding agent on one surface side of the non-magnetic support; and a back coating layer including non-magnetic powder and a binding agent on the other surface side of the non-magnetic support, in which a thickness of the back coating layer is equal to or smaller than 0.30 μm, and an isoelectric point of a surface zeta potential of the back coating layer is equal to or smaller than 3.0.

9 Claims, No Drawings

MAGNETIC TAPE

CROSS-REFERENCE TO RELATED APPLICATIONS

This application claims priority under 35 U.S.C 119 to Japanese Patent Application No. 2017-123080 filed on Jun. 23, 2017. The above application is hereby expressly incorporated by reference, in its entirety, into the present application.

BACKGROUND OF THE INVENTION

1. Field of the Invention

The present invention relates to a magnetic tape.

2. Description of the Related Art

Magnetic recording media are divided into tape-shaped magnetic recording media and disk-shaped magnetic recording media, and tape-shaped magnetic recording media, that is, magnetic tapes are mainly used for storage such as data back-up.

As the magnetic tapes, a magnetic tape including a back coating layer on a surface side of a non-magnetic support opposite to a surface side provided with a magnetic layer has been disclosed in JP1997-190623 A (JP-H09-190623A).

SUMMARY OF THE INVENTION

A magnetic tape is generally accommodated in a magnetic tape cartridge in a state of being wound around a reel. In order to increase recording capacity for one reel of the magnetic tape cartridge, it is necessary to increase a total length of the magnetic tape accommodated in one reel of the magnetic tape cartridge. In order to increase the recording capacity, it is necessary that the magnetic tape is thinned (hereinafter, referred to as "thinning").

As a method of thinning the magnetic tape, a method of decreasing a thickness of a back coating layer is used. In regards to a thickness of a back coating layer, in an example of JP1997-190623A (JP-H09-190623A), formation of a back coating layer having a thickness of 0.6 μm is disclosed (paragraph 0047 of JP1997-190623A (JP-H09-190623A)). Meanwhile, in order to realize even higher recording capacity which is demanded in recent years, it is desired that the back coating layer is even more thinned (hereinafter, referred to as "thinning").

However, the inventors have studied regarding the thinning of the back coating layer, and it is determined that, particularly, in a magnetic tape in which a back coating layer is thinned to have a thickness equal to or smaller than 0.30 μm, a phenomenon in which an edge part of the magnetic tape is damaged (hereinafter, referred to as "edge damage") significantly occurs, after causing the magnetic tape to run in a drive. In regards to this point, more specifically, the recording and/or reproducing of information on the magnetic tape is performed by setting a magnetic tape cartridge in a drive and causing the magnetic tape to run in the magnetic tape cartridge. As described above, since the magnetic tape is accommodated in the magnetic tape cartridge in a state of being wound around the reel, sending of the magnetic tape from the reel and winding thereof are performed during the running. In a case where disordered winding occurs in a case of this winding, an edge of the magnetic tape hits against a flange or the like of a reel and the edge damage may occur. This edge damage may cause an increase in the number of errors in a case of recording and/or a deterioration in running stability. Accordingly, it is necessary that the disordered winding is prevented to reduce the edge damage.

Therefore, an object of the invention is to provide a magnetic tape which includes a back coating layer thinned to have a thickness equal to or smaller than 0.30 μm and in which occurrence of edge damage is prevented.

According to one aspect of the invention, there is provided a magnetic tape comprising: a non-magnetic support; a magnetic layer including ferromagnetic powder and a binding agent on one surface side of the non-magnetic support; and a back coating layer including non-magnetic powder and a binding agent on the other surface side of the non-magnetic support, in which a thickness of the back coating layer is equal to or smaller than 0.30 μm, and an isoelectric point of a surface zeta potential of the back coating layer is equal to or smaller than 3.0.

In one aspect, the isoelectric point may be 1.5 to 3.0.

In one aspect, the binding agent of the back coating layer may be a binding agent including an acidic group.

In one aspect, the acidic group may include at least one kind of acidic group selected from the group consisting of a sulfonic acid group and a salt thereof.

In one aspect, the magnetic tape may further comprise a non-magnetic layer including non-magnetic powder and a binding agent between the non-magnetic support and the magnetic layer.

In one aspect, the thickness of the back coating layer may be 0.05 μm to 0.30 μm.

According to one aspect of the invention, it is possible to provide a magnetic tape which includes a back coating layer thinned to have a thickness equal to or smaller than 0.30 μm and in which occurrence of edge damage is prevented.

DESCRIPTION OF THE PREFERRED EMBODIMENTS

One aspect of the invention relates to a magnetic tape including: a non-magnetic support; a magnetic layer including ferromagnetic powder and a binding agent on one surface side of the non-magnetic support; and a back coating layer including non-magnetic powder and a binding agent on the other surface side of the non-magnetic support, in which a thickness of the back coating layer is equal to or smaller than 0.30 μm, and an isoelectric point of a surface zeta potential of the back coating layer is equal to or smaller than 3.0.

Hereinafter, the magnetic tape will be described more specifically.

Back Coating Layer

Isoelectric Point of Surface Zeta Potential of Back Coating Layer

In the magnetic tape, the isoelectric point of the surface zeta potential of the back coating layer is equal to or smaller than 3.0. In the invention and the specification, the isoelectric point of the surface zeta potential of the back coating layer is a value of pH, in a case where a surface zeta potential of the back coating layer measured by a flow potential method (also referred to as a flow current method) becomes zero. A sample is cut out from the magnetic tape which is a measurement target, and the sample is disposed in a measurement cell so that the surface of the back coating layer which is a target surface for obtaining the surface zeta potential comes into contact with an electrolyte. Pressure in the measurement cell is changed to flow the electrolyte and a flow potential at each pressure is measured, and then, the surface zeta potential is obtained by the following calculation expression.

(Calculation Expression)

$$\zeta = \frac{dI}{dp} \times \frac{\eta}{\varepsilon \varepsilon_0} \frac{L}{A}$$

[$\zeta$: surface zeta potential, p: pressure, I: flow potential, $\eta$: viscosity of electrolyte, $\varepsilon$: relative dielectric constant, $\varepsilon_0$: dielectric constant in a vacuum state, L: length of channel (flow path between two electrodes), A: area of cross section of channel]

The pressure is changed in a range of 0 to 400,000 Pa (0 to 400 mbar). The calculation of the surface zeta potential by flowing the electrolyte to the measurement cell and measuring a flow potential is performed by using electrolytes having different pH (from pH of 9 to pH of 3 at interval of approximately 0.5). A total number of measurement points is 13 from the measurement point of pH 9 to the 13th measurement points of pH 3. By doing so, the surface zeta potentials of each measurement point of pH is obtained. As pH decreases, the surface zeta potential decreases. Thus, two measurement points at which polarity of the surface zeta potential changes (a change from a positive value to a negative value) may appear, while pH decreases from 9 to 3. In a case where such two measurement points appear, pH, in a case where the surface zeta potential is zero, is obtained by interpolation by using a straight line (linear function) showing a relationship between the surface zeta potential and pH of each of the two measurement points. Meanwhile, in a case where all of the surface zeta potentials obtained during the decrease of pH from 9 to 3 is positive value, pH, in a case where the surface zeta potential is zero, is obtained by extrapolation by using a straight line (linear function) showing a relationship between the surface zeta potential and pH of the 13th measurement point (pH of 3) which is the final measurement point and the 12th measurement point. On the other hand, in a case where all of the surface zeta potentials obtained during the decrease of pH from 9 to 3 is negative value, pH, in a case where the surface zeta potential is zero, is obtained by extrapolation by using a straight line (linear function) showing a relationship between the surface zeta potential and pH of the first measurement point (pH of 9) which is the initial measurement point and the 12th measurement point. By doing so, the value of pH, in a case where the surface zeta potential of the back coating layer measured by the flow potential method is zero, is obtained.

The above measurement is performed three times in total at room temperature by using different samples cut out from the same magnetic tape (magnetic tape which is a measurement target), and pH, in a case where the surface zeta potential of each sample is zero, is obtained. For the viscosity and the relative dielectric constant of the electrolyte, a measurement value at room temperature is used. The room temperature is set as 20° C. to 27° C. An arithmetical mean of three pHs obtained as described above is an isoelectric point of the surface zeta potential of the back coating layer of the magnetic tape which is a measurement target. In addition, as the electrolyte having pH of 9, an electrolyte obtained by adjusting pH of a KCl aqueous solution having a concentration of 1 mmol/L to 9 by using a KOH aqueous solution having a concentration of 0.1 mol/L is used. As the electrolyte having other pH, an electrolyte obtained by adjusting pH of the electrolyte having pH of 9, which is adjusted as described above, by using an HCl aqueous solution having a concentration of 0.1 mol/L is used.

The isoelectric point of the surface zeta potential measured by the method described above is an isoelectric point obtained regarding the surface of the back coating layer, unlike an isoelectric point of powder disclosed in JP1997-190623A (JP-H09-190623A), for example. As a result of the intensive studies, the inventors have newly found that, by setting the isoelectric point of the surface zeta potential of the back coating layer to be equal to or smaller than 3.0, it is possible to prevent occurrence of edge damage, even in a case where the back coating layer is thinned to have a thickness equal to or smaller than 0.30 µm. In regards to this point, the inventors have thought as follows. However, the following description is merely a surmise, and the invention is not limited thereto.

The inventors have considered that a reason for which the edge damage significantly occurs, in a case where the back coating layer is thinned to have a thickness equal to or smaller than 0.30 µm, is because scraps are easily generated due to chipping of the surface of the back coating layer caused by a deterioration in rigidity of the back coating layer. Specifically, it is surmised that, in a case where the scraps are strongly stuck to the surface of the back coating layer, a contact state between the surface of the back coating layer and the surface of the magnetic layer is not stabilized, thereby causing disordered winding. With respect to this, the inventors have thought that, in a case of using the back coating layer in which the isoelectric point of the surface zeta potential is in a region of acidic pH equal to or smaller than 3.0, a repulsive force may be easily applied between the scraps generated from this back coating layer and the surface of the back coating layer. The inventors have surmised that preventing the scraps from being strongly stuck to the surface of the back coating layer by this repulsive force may contribute to prevention of disordered winding, resulting in prevention of occurrence of edge damage.

From a viewpoint of further preventing the occurrence of edge damage, the isoelectric point of the surface zeta potential of the back coating layer is preferably equal to or smaller than 2.9, more preferably equal to or smaller than 2.8, even more preferably equal to or smaller than 2.7, and still more preferably equal to or smaller than 2.6, and still even more preferably 2.5.

As will be described later in detail, the isoelectric point of the surface zeta potential of the back coating layer can be controlled by the kind of a binding agent used for forming the back coating layer, a formation step of the back coating layer, and the like. From a viewpoint of availability of a component (for example, binding agent) used for forming the back coating layer, the isoelectric point of the surface zeta potential of the back coating layer is preferably equal to or greater than 1.5, more preferably equal to or greater than 1.8, and even more preferably equal to or greater than 2.0.

However, the invention is not limited to the above surmise and other surmises described in the specification.

Thickness of Back Coating Layer

The thickness of the back coating layer of the magnetic tape is equal to or smaller than 0.30 µm. The thickness of the back coating layer can be, for example, 0.05 to 0.30, 0.10 to 0.30 µm, 0.15 to 0.30 µm, or 0.20 to 0.30 µm. The thinning of the back coating layer to have a thickness equal to or smaller than 0.30 µm contributes to the thinning of the magnetic tape including this back coating layer. However, the thinning of the back coating layer causes occurrence of the edge damage. With respect to this, the occurrence of the edge damage can be prevented by setting the isoelectric point of the surface zeta potential of the back coating layer having a thickness equal to or smaller than 0.30 μm to be equal to or smaller than 3.0. From a viewpoint of further thinning the magnetic tape, the thickness of the back coating layer can also be equal to or smaller than 0.25 μm and equal to or smaller than 0.20 μm.

Component of Back Coating Layer

As the non-magnetic powder included in the back coating layer, any one or both of carbon black and non-magnetic powder other than carbon black can be used. As the non-magnetic powder other than carbon black, powder of an inorganic substance (inorganic powder) can be used. Specific examples thereof include inorganic powder of iron oxide such as α-iron oxide, titanium oxide such as titanium dioxide, cerium oxide, tin oxide, tungsten oxide, ZnO, $ZrO_2$, $SiO_2$, $Cr_2O_3$, α-alumina, β-alumina, γ-alumina, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, and silicon carbide. For the non-magnetic powder included in the back coating layer, the description regarding the non-magnetic powder included in the non-magnetic layer which will be described later can also be referred to.

A shape of the non-magnetic powder other than carbon black may be any of a needle shape, a sphere shape, a polyhedron shape, and a planar shape. An average particle size of the non-magnetic powder is preferably 0.01 to 0.20 μm and more preferably 0.01 to 0.15 μm. In addition, a specific surface area of the non-magnetic powder obtained by a Brunauer-Emmett-Teller (BET) method (BET specific surface area) is preferably 1 to 100 $m^2/g$, more preferably 5 to 70 $m^2/g$, and even more preferably 10 to 65 $m^2/g$. Meanwhile, an average particle size of carbon black is, for example, 5 to 80 nm, preferably 10 to 50 nm, and more preferably 10 to 40 nm. For the content (filling percentage) of the non-magnetic powder in the back coating layer, the description regarding the non-magnetic powder of the non-magnetic layer which will be described later can be referred to.

The back coating layer further includes a binding agent and can randomly include well-known additives. For other details of the binding agent and additives of the back coating layer, a well-known technology regarding the back coating layer can be applied, and a well-known technology regarding the magnetic layer and/or the non-magnetic layer can also be applied. In addition, the description regarding the magnetic layer and the non-magnetic layer which will be described later can also be referred to.

In one aspect, as the binding agent of the back coating layer, a binding agent including an acidic group can be used. The acidic group of the invention and the specification is used as a meaning including a state of a group capable of emitting $H^+$ in water or a solvent including water (aqueous solvent) to dissociate anions and a salt thereof. Specific examples of the acidic group include a sulfonic acid group, a sulfate group, a carboxyl group, a phosphate group, and a salt thereof. For example, a salt of sulfonic acid group (—SO3H) is represented by —SO3M, and M represents a group representing an atom (for example, alkali metal atom or the like) which may be cations in water or in an aqueous solvent. The same applies to aspects of salt of various groups described above. As an example of the binding agent including the acidic group, a resin including at least one kind of acidic group selected from the group consisting of a sulfonic acid group and a salt thereof (for example, a polyurethane resin or a vinyl chloride resin) can be used. However, the resin included in the back coating layer is not limited to these resins. In addition, in the binding agent including the acidic group, a content of the acidic group can be, for example, 0.03 to 0.50 meq/g. The content of various functional groups such as the acidic group included in the resin can be obtained by a well-known method in accordance with the kind of the functional group. The amount of the binding agent used in a back coating layer forming composition can be, for example, 1.0 to 30.0 parts by mass with respect to 100.0 parts by mass of the non-magnetic powder.

In regards to the controlling of the isoelectric point of the surface zeta potential of the back coating layer, the inventors have surmised that formation of the back coating layer so that the acidic component is unevenly distributed to a surface portion of the back coating layer contributes to a decrease in value of the isoelectric point. In addition, it is surmised that formation of the back coating layer so as to decrease the amount of a basic component present in the surface portion of the back coating layer also contributes to a decrease in value of the isoelectric point. The acidic component is used as a meaning including a state of a component capable of emitting $H^+$ in water or an aqueous solvent to dissociate anions and a salt thereof. The basic component is used as a meaning including a state of a component capable of emitting $OH^-$ in water or an aqueous solvent to dissociate cations and a salt thereof. For example, it is thought that, in a case of using the acidic component, uneven distribution of the acidic component to the surface portion of the back coating layer contributes to a decrease in value of the isoelectric point of the surface zeta potential of the back coating layer to control the isoelectric point to be equal to or smaller than 3.0. For example, the inventors have thought that, in a step of applying a back coating layer forming composition onto a non-magnetic support, the applying which is performed in an alternating magnetic field by applying an alternating magnetic field contributes to formation of a back coating layer in which the acidic component is unevenly distributed to the surface portion. As the acidic component, for example, a binding agent including an acidic group can be used. In addition, the inventors have surmised that, in a case of using the binding agent including an acidic group, in a preparation step of the back coating layer forming composition, the addition (additional addition) of the binding agent even in a case of preparing a dispersion liquid including non-magnetic powder and the binding agent and then mixing this dispersion liquid with other components, contributes to formation of a back coating layer in which the binding agent including the acidic group is unevenly distributed to the surface portion. The formation of the back coating layer will be described later more specifically.

Next, the magnetic layer or the like of the magnetic tape will be described more specifically.

Magnetic Layer

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic recording medium. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization.

As a preferred specific example of the ferromagnetic powder, ferromagnetic hexagonal ferrite powder can be used. An average particle size of the ferromagnetic hexagonal ferrite powder is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351A can be referred to, for example.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on photographic printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate are directly in contact with each other, but also includes an aspect in which a binding agent or an additive which will be described later is interposed between the particles. A term "particles" is also used for describing the powder.

As a method of collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably 50% to 90% by mass and more preferably 60% to 90% by mass. The components other than the ferromagnetic powder of the magnetic layer are at least a binding agent and one or more kinds of additives may be further randomly included. A high filling percentage of the ferromagnetic powder in the magnetic layer is preferable from a viewpoint of improvement recording density.

Binding Agent and Curing Agent

The magnetic tape is a coating type magnetic tape and includes a binding agent in the magnetic layer. The binding agent is one or more kinds of resin. As the binding agent, various resins normally used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in the non-magnetic layer and/or a back coating layer which will be described later.

For the binding agent described above, description disclosed in paragraphs 0028 to 0031 of JP2010-24113A can be referred to. For the binding agent included in each layer, the above description regarding the binding agent of the back coating layer can also be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

Additives

The magnetic layer includes ferromagnetic powder and the binding agent, and may include one or more kinds of additives, if necessary. As the additives, the curing agent described above is used as an example. In addition, examples of the additive included in the magnetic layer include non-magnetic powder (for example, inorganic powder or carbon black), a lubricant, a dispersing agent, a dispersing assistant, an antibacterial agent, an antistatic agent, and an antioxidant. As the non-magnetic powder, non-magnetic powder which can function as an abrasive, non-magnetic powder (for example, non-magnetic colloid particles) which can function as a projection formation agent which forms projections suitably protruded from the surface of the magnetic layer, and the like can be used. An average particle size of colloidal silica (silica colloid particles) shown in the examples which will be described later is a value obtained by a method disclosed in a measurement method of an average particle diameter in a paragraph 0015 of JP2011-048878A. As the additives, a commercially available product can be suitably selected according to the desired properties or manufactured by a well-known method, and can be used with any amount. As an example of the additive which can be used in the magnetic layer including the abrasive, a dispersing agent disclosed in paragraphs 0012 to 0022 of JP2013-131285A can be used as a dispersing agent for improving dispersibility of the abrasive.

The magnetic layer described above can be provided on the surface of the non-magnetic support directly or indirectly through the non-magnetic layer.

Non-Magnetic Layer

Next, the non-magnetic layer will be described. The magnetic tape may include a magnetic layer directly on the surface of the non-magnetic support or may include a magnetic layer on the surface of the non-magnetic support directly or indirectly through the non-magnetic layer including the non-magnetic powder and the binding agent. The non-magnetic powder used in the non-magnetic layer may be inorganic powder or organic powder. In addition, carbon black and the like can be used. Examples of the inorganic powder include powder of metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50% to 90% by mass and more preferably 60% to 90% by mass.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

In the invention and the specification, the non-magnetic layer also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m(100 Oe), or a layer having a residual magnetic flux density equal to or smaller than 10 mT and coercivity equal to or smaller than 7.96 kA/m(100 Oe). It is preferable that the non-magnetic layer does not have a residual magnetic flux density and coercivity.

Non-Magnetic Support

Next, the non-magnetic support (hereinafter, also simply referred to as a "support") will be described. As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Various Thicknesses

A thickness of the non-magnetic support is preferably 3.00 to 20.00 μm, more preferably 3.00 to 10.00 μm, and even more preferably 3.00 to 6.00 μm.

A thickness of the magnetic layer can be optimized according to a saturation magnetization amount of a magnetic head used, a head gap length, a recording signal band, and the like. The thickness of the magnetic layer is normally 0.01 μm to 0.15 μm, and is preferably 0.02 μm to 0.12 μm and more preferably 0.03 μm to 0.10 μm from a viewpoint of realization of high-density recording. The magnetic layer may be at least one layer, or the magnetic layer can be separated to two or more layers having magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.10 to 1.50 μm and is preferably 0.10 to 1.00 μm.

A thickness of the back coating layer is as described above.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scanning electron microscope. In the cross section observation, various thicknesses can be acquired as a thickness acquired at one portion of the cross section in the thickness direction, or an arithmetical mean of thicknesses acquired at a plurality of portions of two or more portions, for example, two portions which are randomly extracted. In addition, the thickness of each layer may be acquired as a designed thickness calculated according to the manufacturing conditions.

Manufacturing Method of Magnetic Tape

Each composition for forming the magnetic layer, the back coating layer, and the non-magnetic layer which is randomly provided, normally includes a solvent, together with various components described above. As the solvent, various organic solvents generally used for manufacturing a coating type magnetic recording medium can be used. The amount of the solvent in each layer forming composition is not particularly limited, and can be set to be the same as that of each layer forming composition of a typical coating type magnetic recording medium. Steps of preparing the composition for forming each layer generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. For example, in the preparation of the back coating layer forming composition, the binding agent including an acidic group can be separately added through two or more steps. It is preferable that a dispersion liquid is prepared by mixing some components including the non-magnetic powder among the various components of the back coating layer forming composition with the binding agent including an acidic group and dispersing the mixture in a solvent, and the binding agent including an acidic group is also added in a step of mixing the dispersion liquid with the remaining components and performing dispersing, because it is possible to contribute to the controlling of the isoelectric point of a surface zeta potential of the back coating layer to be equal to or smaller than 3.0.

In order to prepare each layer forming composition, a well-known technology can be used. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). In addition, in order to disperse each layer forming composition, as a dispersion medium, at least one or more kinds of dispersion beads selected from the group consisting of glass beads and other dispersion beads can be used. As such dispersion beads, zirconia beads, titanic beads, and steel beads which are dispersion beads having high specific gravity are suitable. These dispersion beads are preferably used by optimizing a particle diameter (bead diameter) and a filling percentage. As a dispersing machine, a well-known dispersing machine can be used. Each layer forming composition may be filtered by a well-known method before performing the coating step. The filtering can be performed by using a filter, for example. As the filter used in the filtering, a filter having a hole diameter of 0.01 to 3 μm (for example, filter made of glass fiber or filter made of polypropylene) can be used, for example.

The magnetic layer can be formed by directly applying the magnetic layer forming composition onto the surface of the non-magnetic support or performing multilayer coating with the non-magnetic layer forming composition in order or at the same time. The back coating layer can be formed by directly applying the back coating layer forming composition onto the surface of the non-magnetic support where the magnetic layer is formed or the surface thereof on a side opposite to the surface where the magnetic layer is to be formed. For details of the coating for forming each layer, a description disclosed in a paragraph 0066 of JP2010-231843A can be referred to. In addition, the coating of the back coating layer forming composition performed in an alternating magnetic field can contribute to the controlling of the isoelectric point of a surface zeta potential of the back coating layer to be equal to or smaller than 3.0. The inventors have surmised that this is because, an acidic component (for example, the binding agent including an acidic group) is easily unevenly distributed to a surface portion of a coating layer of the back coating layer forming composition due to the applied alternating magnetic field, and thus, by drying this coating layer, a back coating layer in which the acidic component is unevenly distributed to the surface portion is obtained. However, this is merely a surmise. The applying of the alternating magnetic field can be performed by disposing a magnet in a coating device so that the alternating magnetic field is applied vertically to the surface of the coating layer of the back coating layer forming composition. A magnetic field strength of the alternating magnetic field can be, for example, set as approximately 0.05 to 3.00 T. However, there is no limitation to this range. The "vertical" in the invention and the specification does not mean only a vertical direction in the strict sense, but also includes a range of errors allowed in the technical field of the invention. For example, the range of errors means a range of less than ±10° from an exact vertical direction.

For various other steps for manufacturing the magnetic tape, a well-known technology can be applied. For details of the various steps, descriptions disclosed in paragraphs 0067 to 0070 of JP2010-231843A can be referred to, for example.

As described above, it is possible to obtain the magnetic tape according to one aspect of the invention. The magnetic tape is normally accommodated in a magnetic tape cartridge and the magnetic tape cartridge is mounted in a magnetic tape device (referred to as a drive). A servo pattern can also be formed in the magnetic tape by a well-known method, in order to allow head tracking servo to be performed in the drive. The magnetic tape according to one aspect of the invention includes a back coating layer thinned to have a thickness equal to or smaller than 0.30 μm and can prevent a phenomenon in which an edge part of the magnetic tape is damaged (edge damage) occurs, after causing the magnetic tape to run in a drive.

EXAMPLES

Hereinafter, the invention will be described with reference to examples. However, the invention is not limited to aspects shown in the examples. "Parts" and "%" in the following description are based on mass.

A "binding agent A" described below is a $SO_3Na$ group-containing polyurethane resin (weight-average molecular weight: 70,000, $SO_3Na$ group: 0.20 meq/g).

A "binding agent B" described below is a vinyl chloride copolymer (product name: MR110, $SO_3K$ group-containing vinyl chloride copolymer, $SO_3K$ group: 0.07 meq/g) manufactured by Kaneka Corporation.

Manufacturing of Magnetic Tape

Example 1

(1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a $SO_3Na$ group-containing polyester polyurethane resin (UR-4800 ($SO_3Na$ group: 0.08 meq/g) manufactured by Toyobo Co., Ltd.), and 570.0 parts of a mixed solvent of methyl ethyl ketone and cyclohexanone (mass ratio of 1:1) as a solvent were mixed with 100.0 parts of alumina powder (HIT-80 manufactured by Sumitomo Chemical Co., Ltd.) having a gelatinization ratio of 65% and a Brunauer-Emmett-Teller (BET) specific surface area of 20 $m^2/g$, and dispersed in the presence of zirconia beads by a paint shaker for 5 hours. After the dispersion, the dispersion liquid and the beads were separated by a mesh and an alumina dispersion was obtained.

(2) Magnetic Layer Forming Composition List
Magnetic Liquid
Ferromagnetic powder: 100.0 parts
Ferromagnetic hexagonal barium ferrite powder having average particle size (average plate diameter) of 21 nm
Binding agent A: 15.0 parts
Cyclohexanone: 150.0 parts
Methyl ethyl ketone: 150.0 parts
Abrasive Solution
Alumina dispersion prepared in the section (1): 6.0 parts
Silica Sol (projection forming agent liquid)
Colloidal silica (Average particle size: 120 nm) 2.0 parts
Methyl ethyl ketone: 1.4 parts
Other Components
Stearic acid: 2.0 parts
Stearic acid amide: 0.2 parts
Butyl stearate: 2.0 parts
Polyisocyanate (CORONATE (registered trademark) manufactured by Tosoh Corporation): 2.5 parts
Finishing Additive Solvent
Cyclohexanone: 200.0 parts
Methyl ethyl ketone: 200.0 parts
(3) Non-Magnetic Layer Forming Composition List
Non-magnetic inorganic powder: α-iron oxide: 100.0 parts
Average particle size (average long axis length): 0.15 μm
Average acicular ratio: 7
BET specific surface area: 52 $m^2/g$
Carbon black: 20.0 parts
Average particle size: 20 nm
Binding agent A: 18.0 parts
Stearic acid: 2.0 parts
Stearic acid amide: 0.2 parts
Butyl stearate: 2.0 parts
Cyclohexanone: 300.0 parts
Methyl ethyl ketone: 300.0 parts
(4) Back Coating Layer Forming Composition List
Non-magnetic inorganic powder: α-iron oxide: 80.0 parts
Average particle size (average long axis length): 0.15 μm
Average acicular ratio: 7
BET specific surface area: 52 $m^2/g$
Carbon black: 20.0 parts
Average particle size: 20 nm
Binding agent (see Table 1): see Table 1
Phenylphosphonic acid: 3.0 parts
Methyl ethyl ketone: 155.0 parts
Polyisocyanate: 5.0 parts
Cyclohexanone: 355.0 parts
(5) Preparation of Each Layer Forming Composition The magnetic layer forming composition was prepared by the following method.

The magnetic liquid was prepared by dispersing (beads-dispersing) each component by using a batch type vertical sand mill for 24 hours. Zirconia beads having a bead diameter of 0.5 mm were used as the dispersion beads.

The prepared magnetic liquid, the abrasive solution, and other components (silica sol, other components, and finishing additive solvent) were mixed with each other and beads-dispersed for 5 minutes by using the sand mill, and the treatment (ultrasonic dispersion) was performed with a batch type ultrasonic device (20 kHz, 300 W) for 0.5 minutes. After that, the obtained mixed solution was filtered by using a filter having a hole diameter of 0.5 μm, and the magnetic layer forming composition was prepared.

The non-magnetic layer forming composition was prepared by the following method.

Each component excluding the lubricant (stearic acid, stearic acid amide, and butyl stearate), cyclohexanone, and methyl ethyl ketone was dispersed by using batch type vertical sand mill for 24 hours to obtain a dispersion liquid. As the dispersion beads, zirconia beads having a bead diameter of 0.5 mm were used. After that, the remaining components were added into the obtained dispersion liquid and stirred with a dissolver. The dispersion liquid obtained as described above was filtered with a filter having a hole diameter of 0.5 μm and a non-magnetic layer forming composition was prepared.

The back coating layer forming composition was prepared by the following method.

Each component excluding polyisocyanate and cyclohexanone was kneaded by an open kneader and diluted, and was subjected to a dispersion process of 12 passes, with a transverse beads mill disperser and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components and the binding agent A to be additionally added (0.1 parts with respect to 100.0 parts of the non-magnetic powder (non-magnetic inorganic powder and carbon black) were added into the obtained dispersion liquid and stirred with a dissolver. The dispersion liquid obtained as described above was filtered with a filter having a hole diameter of 1 μm and a back coating layer forming composition was prepared.

(6) Manufacturing Method of Magnetic Tape

The non-magnetic layer forming composition prepared in the section (5) was applied to a surface of a support made of polyethylene naphthalate having a thickness of 5.00 μm so that the thickness after the drying becomes 1.00 μm and was dried to form a non-magnetic layer.

Then, the magnetic layer forming composition prepared in the section (5) was applied onto the surface of the non-magnetic layer so that the thickness after the drying becomes 0.10 μm, and a coating layer was formed. After that, a homeotropic alignment process was performed by applying a magnetic field having a magnetic field strength of 0.30 T in a vertical direction with respect to a surface of a coating layer, while the coating layer of the magnetic layer forming composition is wet (not dried). After that, the coating layer was dried to form a magnetic layer.

After that, the back coating layer forming composition prepared in the section (5) was applied to the surface of the support made of polyethylene naphthalate on a side opposite to the surface where the non-magnetic layer and the magnetic layer were formed, so that the thickness after the drying becomes a thickness shown in Table 1, and was dried to form a back coating layer. The coating of the back coating layer forming composition was performed while applying the alternating magnetic field (magnetic field strength: 0.15 T) vertically to the surface of the coating layer of the back coating layer forming composition, in a coating device disposed with a magnet for applying the alternating magnetic field.

After that, a surface smoothing treatment (calender process) was performed by using a calender roll configured of only a metal roll, at a speed of 100 m/min, linear pressure of 294 kN/m (300 kg/cm), and a calender temperature (surface temperature of a calender roll) of 100° C.

Then, the heat treatment was performed in the environment of the atmosphere temperature of 70° C. for 36 hours. After the heat treatment, the slitting was performed to have a width of ½ inches (0.0127 meters), and a servo pattern was formed on the magnetic layer by a commercially available servo writer.

By doing so, a magnetic tape of Example 1 was manufactured.

Examples 2 to 8 and Comparative Examples 1 to 10

A magnetic tape was manufactured by the same method as in Example, except that various conditions were changed as shown in Table 1.

In Table 1, in the examples and the comparative examples in which "performed" is shown in the column of the additional addition of the binding agent, the additional addition of the binding agent A (0.1 parts with respect to 100.0 parts of the non-magnetic powder (non-magnetic inorganic powder and carbon black) was performed in the same manner as in Example 1. On the other hand, in the comparative examples in which "not performed" is shown in this column, the additional addition of the binding agent A was not performed.

In Table 1, in the examples and the comparative examples in which "performed" is shown in the column of the alternating magnetic field application during coating, the step subsequent to the coating step of the back coating layer forming composition was performed by the same method as in Example 1. That is, the application of the alternating magnetic field was performed during coating of the back coating layer forming composition in the same manner as in Example 1. On the other hand, in the comparative examples in which "not performed" is shown in this column, the step subsequent to the coating step of the back coating layer forming composition was performed by the same method as in Example 1, except that the application of the alternating magnetic field was not performed.

A thickness of the back coating layer of each magnetic tape of the examples and the comparative examples was obtained by the following method. A cross section of the magnetic tape in a thickness direction was exposed by ion beams and the exposed cross section was observed with a scanning electron microscope. A thickness of the back coating layer was obtained as an arithmetical mean of thicknesses obtained at two portions in the thickness direction in the cross section observation.

Evaluation of Physical Properties of Magnetic Tape (1) Isoelectric Point of Surface Zeta Potential of Back Coating Layer Six samples for isoelectric point measurement were cut out from each magnetic tape of the examples and the comparative examples and disposed in the measurement cell of two samples in one measurement. In the measurement cell, a sample installing surface and a surface of the magnetic layer of the sample were bonded to each other by using a double-sided tape in upper and lower sample table (size of each sample installing surface is 1 cm×2 cm) of the measurement cell. Accordingly, in a case where an electrolyte flows in the measurement cell, the surface of the back coating layer of the sample comes into contact with the electrolyte, and thus, the surface zeta potential of the back coating layer can be measured. The measurement was performed three times in total by using two samples in each measurement, and the isoelectric points of the surface zeta potential of the back coating layer were obtained. An arithmetical mean of the obtained three values was shown in Table 1, as the isoelectric point of the surface zeta potential of the back coating layer of each magnetic tape. As a surface zeta potential measurement device, SurPASS manufactured by Anton Paar was used. The measurement conditions were set as follows. Other details of the method of obtaining the isoelectric point is as described above.

Measurement cell: variable gap cell (20 mm×10 mm)
Measurement mode: Streaming Current
Gap: approximately 200 μm
Measurement temperature: room temperature
Ramp Target Pressure/Time: 400,000 Pa (400 mbar)/60 seconds
Electrolyte: KCl aqueous solution having concentration of 1 mmol/L (adjusted pH to 9)
pH adjusting solution: HCl aqueous solution having concentration of 0.1 mol/L or KOH aqueous solution having concentration of 0.1 mol/L
Measurement pH: pH 9→pH 3 (measured at 13 measurement points in total at interval of approximately 0.5

(2) Evaluation of Edge Damage

The following evaluation was performed in an environment at a temperature of 23° C. and relative humidity of 50%.

A magnetic tape cartridge accommodating each magnetic tape (magnetic tape total length of 500 m) of the examples and the comparative examples was set in a drive of Linear Tape-Open Generation 6 (LTO-G6) manufactured by IBM, and the magnetic tape was subjected to reciprocating running 1,500 times at tension of 0.6 N and a running speed of 5 m/sec.

The magnetic tape cartridge after the running was set in a reference drive (LTO-G6 drive manufactured by IBM), and the magnetic tape is allowed to run to perform the recording and reproducing. A reproducing signal during the running was introduced to an external analog/digital (AD) conversion device. A signal having a reproducing signal amplitude which is decreased 70% or more than an average (average of measured values at each track) respectively in a track closest to one edge of the magnetic tape and a track closest to the other edge thereof was set as a missing pulse, a generation frequency (number of times of the generation) thereof was divided by the total length of the magnetic tape to obtain a missing pulse generation frequency (unit: times/m) per unit length of the magnetic tape (per 1 m).

As the edge damage heavily occurs, the missing pulse generation frequency obtained by the method described above increases. Accordingly, the missing pulse generation frequency obtained by the method described above becomes an index for the edge damage. In a case where the missing pulse generation frequency is equal to or smaller than 10.0 number/m, it is possible to determine that the occurrence of the edge damage is prevented to a sufficient practical level. The position where the edge damage occurs is not constant, and therefore, in this evaluation, the measurement result having a missing pulse generation frequency was used as the missing pulse generation frequency, among the measurement result in a track closest to one edge and the measurement result in a track closest to the other edge, and was shown in Table 1.

The results of the above evaluation are shown in Table 1 (Table 1-1 and Table 1-2).

TABLE 1-1

|  |  |  | Example 1 | Example 2 | Example 3 | Example 4 | Example 5 | Example 6 | Example 7 | Example 8 |
|---|---|---|---|---|---|---|---|---|---|---|
| Thickness of back coating layer | | | 0.30 μm | 0.30 μm | 0.30 μm | 0.30 μm | 0.20 μm | 0.10 μm | 0.30 μm | 0.30 μm |
| Composition of back coating layer | Content of binding agent in dispersion liquid | Binding agent A | 5 parts | 10 parts | 15 parts | 20 parts | 10 parts | 10 parts | 0 parts | 10 parts |
| | | Binding agent B | 0 parts | 0 parts | 0 parts | 0 parts | 0 parts | 0 parts | 10 parts | 10 parts |
| Additional addition of binding agent | | | Performed | Performed | Performed | Performed | Performed | Performed | Performed | Performed |
| Alternating magnetic field application during coating | | | Performed | Performed | Performed | Performed | Performed | Performed | Performed | Performed |
| Isoelectric point of surface zeta potential of back coating layer | | | 3.0 | 2.7 | 2.3 | 2.0 | 2.5 | 2.4 | 2.5 | 2.2 |
| Missing pulse generation frequency (times/m) | | | 4.2 | 3.9 | 3.7 | 3.3 | 4.1 | 5.5 | 4.0 | 3.5 |

TABLE 1-2

|  |  |  | Comparative Example 1 | Comparative Example 2 | Comparative Example 3 | Comparative Example 4 | Comparative Example 5 |
|---|---|---|---|---|---|---|---|
| Thickness of back coating layer | | | 0.40 μm | 0.30 μm | 0.30 μm | 0.30 μm | 0.30 μm |
| Composition of back coating layer | Content of binding agent in dispersion liquid | Binding agent A | 5 parts | 5 parts | 10 parts | 15 parts | 20 parts |
| | | Binding agent B | 0 parts | 0 parts | 0 parts | 0 parts | 0 parts |
| Additional addition of binding agent | | | Not performed | Not performed | Not performed | Not performed | Not performed |
| Alternating magnetic field application during coating | | | Not performed | Not performed | Not performed | Not performed | Not performed |
| Isoelectric point of surface zeta potential of back coating layer | | | 4.0 | 4.0 | 3.8 | 3.8 | 3.7 |
| Missing pulse generation frequency (times/m) | | | 3.5 | 13.4 | 14.1 | 12.9 | 14.3 |

|  |  |  | Comparative Example 6 | Comparative Example 7 | Comparative Example 8 | Comparative Example 9 | Comparative Example 10 |
|---|---|---|---|---|---|---|---|
| Thickness of back coating layer | | | 0.10 μm | 0.30 μm | 0.30 μm | 0.30 μm | 0.30 μm |
| Composition of back coating layer | Content of binding agent in dispersion liquid | Binding agent A | 5 parts | 15 parts | 15 parts | 0 parts | 10 parts |
| | | Binding agent B | 0 parts | 0 parts | 0 parts | 10 parts | 10 parts |
| Additional addition of binding agent | | | Not performed | Performed | Not performed | Not performed | Not performed |
| Alternating magnetic field application during coating | | | Not performed | Not performed | Performed | Not performed | Not performed |
| Isoelectric point of surface zeta potential of back coating layer | | | 3.7 | 4.2 | 4.1 | 3.8 | 4.0 |
| Missing pulse generation frequency (times/m) | | | 19.7 | 15.5 | 15.6 | 13.0 | 13.2 |

In the magnetic tape of Comparative Example 1 in which the thickness of the back coating layer is greater than 0.30 µm, the missing pulse generation frequency was equal to or smaller than 10.0 number/m, even in a case where the isoelectric point of the surface zeta potential of the back coating layer is greater than 3.0. In contrast, in the magnetic tapes of Comparative Examples 2 to 10 in which the thickness of the back coating layer is equal to or smaller than 0.30 mm and the isoelectric point of the surface zeta potential of the back coating layer is greater than 3.0, the missing pulse generation frequency was greater than 10.0 number/m.

From the results described above, it is possible to confirm that, in a case where the back coating layer is thinned to have a thickness equal to or smaller than 0.30 µm and measures are not prepared, the edge damage occurs.

With respect to this, with the comparison of Examples 1 to 8 and Comparative Examples 2 to 10, it is possible to confirm that it is possible to prevent the occurrence of the edge damage, by setting the isoelectric point of the surface zeta potential of the back coating layer to be equal to or smaller than 3.0, in the magnetic tape in which the thickness of the back coating layer is equal to or smaller than 0.30 µm.

One aspect of the invention is effective in the technical fields of magnetic tapes such as back-up tapes.

What is claimed is:

1. A magnetic tape comprising:
   a non-magnetic support;
   a magnetic layer including ferromagnetic powder and a binding agent on one surface side of the non-magnetic support; and
   a back coating layer including non-magnetic powder and a binding agent on another surface side of the non-magnetic support,
   wherein the thickness of the back coating layer is equal to or smaller than 0.30 µm, and
   the isoelectric point of the surface zeta potential of the back coating layer is equal to or smaller than 3.0.

2. The magnetic tape according to claim 1,
   wherein the isoelectric point is 1.5 to 3.0.

3. The magnetic tape according to claim 2,
   wherein the binding agent of the back coating layer is a binding agent including an acidic group.

4. The magnetic tape according to claim 3,
   wherein the acidic group includes at least one kind of acidic group selected from the group consisting of a sulfonic acid group and a salt thereof.

5. The magnetic tape according to claim 1,
   wherein the binding agent of the back coating layer is a binding agent including an acidic group.

6. The magnetic tape according to claim 5,
   wherein the acidic group includes at least one kind of acidic group selected from the group consisting of a sulfonic acid group and a salt thereof.

7. The magnetic tape according to claim 1, further comprising:
   a non-magnetic layer including non-magnetic powder and a binding agent between the non-magnetic support and the magnetic layer.

8. The magnetic tape according to claim 1,
   wherein the thickness of the back coating layer is 0.05 µm to 0.30 µm.

9. The magnetic tape according to claim 1,
   wherein the isoelectric point is 1.5 to 2.7.

\* \* \* \* \*